United States Patent
Ogasawara et al.

(10) Patent No.: US 7,169,217 B2
(45) Date of Patent: Jan. 30, 2007

(54) INK AND INK-JET RECORDING METHOD USING THE SAME

(75) Inventors: Yuki Ogasawara, Hino (JP); Akihiko Takeda, Sagamiko-machi (JP); Daisuke Ishibashi, Hino (JP)

(73) Assignee: Konica Minolta Holdings, Inc., Tokyo (JP)

( * ) Notice: Subject to any disclaimer, the term of this patent is extended or adjusted under 35 U.S.C. 154(b) by 112 days.

(21) Appl. No.: 10/922,016

(22) Filed: Aug. 19, 2004

(65) Prior Publication Data

US 2005/0045062 A1    Mar. 3, 2005

(30) Foreign Application Priority Data

Aug. 28, 2003   (JP)   ............... 2003-304341

(51) Int. Cl.
*C09D 11/00*   (2006.01)
(52) U.S. Cl. .................... 106/31.27; 106/31.6
(58) Field of Classification Search ............. 106/31.27, 106/31.6
See application file for complete search history.

(56) References Cited

U.S. PATENT DOCUMENTS

| | | | | |
|---|---|---|---|---|
| 4,533,923 A | * | 8/1985 | Suzuki | 347/100 |
| 5,116,409 A | * | 5/1992 | Moffatt | 106/31.43 |
| 5,118,351 A | * | 6/1992 | Shirota et al. | 106/31.51 |
| 5,165,968 A | * | 11/1992 | Johnson et al. | 427/288 |
| 5,849,815 A | | 12/1998 | Aoki et al. | |
| 5,972,082 A | * | 10/1999 | Koyano et al. | 106/31.27 |
| 6,183,548 B1 | * | 2/2001 | Erdtmann et al. | 106/31.48 |
| 6,558,458 B1 | * | 5/2003 | Gloster | 106/31.27 |
| 6,698,875 B2 | * | 3/2004 | Onishi et al. | 347/100 |

FOREIGN PATENT DOCUMENTS

| | | |
|---|---|---|
| EP | 0 649 888 A2 | 4/1995 |
| EP | 0 656 406 A2 | 6/1995 |
| EP | 1 078 962 | 2/2001 |
| EP | 04 10 3977 | 11/2004 |

* cited by examiner

*Primary Examiner*—J. A. Lorengo
*Assistant Examiner*—Veronica Faison-Gee
(74) *Attorney, Agent, or Firm*—Lucas & Mercanti, LLP (57) ABSTRACT

An ink containing water, a water-soluble organic solvent and a colorant, wherein the ink exhibits a $(\gamma \cos \theta)^{1/2}$ value of 4 to 6, and satisfies Formula (I): $0.3 \leq ((\gamma' \cos \theta')^{1/2}/(\gamma \cos \theta)^{1/2}) \leq 0.85$, wherein $\gamma$ represents a surface tension (mN/m) of the ink upon initial exposure to atmospheric conditions, $\theta$ represents an initial contact angle of the ink with respect to plain paper upon initial exposure to atmospheric conditions; and $\gamma'$ represents a surface tension (mN/m) of the ink after standing for one hour at 40° C. and relative humidity of 2 percent, and $\theta'$ represents an initial contact angle of the ink with respect to plain paper after standing for one hour at 40° C. and relative humidity of 2 percent.

9 Claims, 1 Drawing Sheet

FIG. 1

INK AND INK-JET RECORDING METHOD USING THE SAME

TECHNICAL FIELD

The present invention relates to an ink and an ink-jet recording method.

BACKGROUND

Ink-jet recording methods have been practiced in which recording is carried out by ejecting colorant containing ink droplets from ejection orifices. It is required that inks which are employed for ink-jet recording can preferably be printed onto plain paper (for example, PPC paper such as electrophotographic paper and recording paper commonly employed for general business use such as continuous paper sheets for computers.

However, when plain paper is employed, irregular bleeding (feathering) of image edges tends to occur resulting in degradation of printing quality. In order to minimize such feathering, one known method is to lower the surface tension by addition of solvents such as polyhydric alcohols (for example, 1,2-hexanediol), or alkyl ethers (for example, triethylene glycol monobutyl ether). When polyhydric alcohols or alkyl ethers are incorporated to achieve the desired improvements, problems tend to occur in which fine lines are broadened (bleeding), and ink penetrates to the reverse side of plain paper (reverse side penetration), whereby it is not possible to achieve the desired image density. Further, when ink excessively penetrates to the reverse side, problems occur in which it is not possible to record both sides of plain paper by the use of ink-jet printing.

Further, it has been demanded to minimize the generation of mottling (beading) in solid image printed portions. Problems of mixing between colors (bleeding) remains unsolved.

In order to overcome these image quality problems related to plain paper, methods are reported (refer, for example, to Patent Documents 1 and 2) in which polysaccharides or specific surface active agents are added to ink. Further, reported is a method (refer, for example, to Patent Document 3) in which a liquid composition comprising a cationic substance is allowed to react with an ink comprising an anionic substance on the medium to be recorded; a method (refer, for example, to Patent Document 4) in which ink penetration is controlled employing a heater; and a method (refer, for example, to Patent Document 5) in which an image is formed on a transfer body and the resulting image is transferred to a recording medium. However, these methods, in turn, result in problems of storage stability as well as problems in which the apparatus becomes over-sized.

Further, ink-jet printers are required to achieve performance which not only results in high image quality but also stably ejects ink over an extended period of time. The aforesaid performance occasionally depends on the structure of colorants. However, detailed investigation has not been performed and these problems have not yet been overcome. As noted above, based on conventional techniques, it is possible to find means in which specific performance is independently improved. However, no inks have been prepared which simultaneously meet the required performance and solve the series of problems.

(Patent Document 1) Japanese Patent Publication Open to Public Inspection (hereinafter referred to as JP-A) No. 6-228477 (claims)

(Patent Document 2) JP-A No. 8-337749 (claims)

(Patent Document 3) JP-A No. 8-216498 (claims)

(Patent Document 4) JP-A No. 11-129460 (claims)

(Patent Document 5) JP-A No. 5-255623 (claims)

SUMMARY

An object of the present invention is to provide an ink, and an ink-jet recording method which hardly results in irregular bleeding (feathering) at the edges of images, and ink penetration to the reverse side of paper (reverse side penetration), as well as generation of mottling (beading) on solid image printed portions and fine line broadening (bleeding) while using plain paper such as copy paper. In addition to the aforesaid objective, another objective of the present invention is to provide ink, a recording method, and an ink-jet recording method which hardly result in mixing between colors (bleeding).

The above objects of the present invention can be achieved by the use of the embodiments below.

The present invention makes it possible to realize an ink, a recording method, and an ink-jet recording method which hardly result in irregular bleeding (feathering) at the edges of images, and ink penetration to the reverse side of paper (reverse side penetration) as well as generation of mottling (beading) on solid image printed portions, as well as fine line broadening (bleeding), while using plain paper such as copy paper.

An embodiments of the present invention includes: an ink containing water, a water-soluble organic solvent and a colorant, wherein the ink exhibits a $(\gamma \cos \theta)^{1/2}$ value of 4 to 6, and satisfies Formula (I):

$$0.3 \leq ((\gamma' \cos \theta')^{1/2}/(\gamma \cos \theta)^{1/2}) \leq 0.85, \quad \text{Formula (I)}$$

wherein $\gamma$ represents a surface tension (mN/m) of the ink upon initial exposure to atmospheric conditions, $\theta$ represents an initial contact angle of the ink with respect to plain paper upon initial exposure to atmospheric conditions; and $\gamma'$ represents a surface tension (mN/m) of the ink after standing for one hour at 40° C. and relative humidity of 2 percent, and $\theta'$ represents an initial contact angle of the ink with respect to plain paper after standing for one hour at 40° C. and relative humidity of 2 percent.

Another embodiment of the present invention includes the aforementioned ink exhibiting further a decrease of viscosity in an amount of 0.0–2.0 mPa.s when the ink has been allowed to stand for one hour at 40° C. and 2 percent relative humidity after production of the ink or opening a sealed ink container storing the ink.

DESCRIPTION OF PREFERRED EMBODIMENTS

The present invention is detailed below.

Preferred embodiments of the present invention include the following structures:

A method for producing an ink-jet image comprising, setting the ink of the present invention to an ink-jet printer; and jetting droplets of the ink onto a surface of a recording material through a nozzle of an ink-jet head of the ink-jet printer.

A method for producing an ink-jet image comprising,
setting the ink of the present invention to an ink-jet printer; and
jetting droplets of a plurality of inks which includes the ink of the present invention onto a surface of a recording material through a nozzle of an ink-jet head of the ink-jet printer,
wherein the colorant contained in the ink of the present invention has a black color.

A method for producing an ink-jet image comprising,
setting the ink of the present invention to an ink-jet printer; and
jetting droplets of a plurality of inks onto a surface of a recording material through a nozzle of an ink-jet head of the ink-jet printer,
wherein the plurality of inks are the inks of the present invention.

A method for producing an ink-jet image comprising,
setting the ink of the present invention to an ink-jet printer; and
jetting droplets of the ink of the present invention onto a surface of a recording material through a nozzle of an ink-jet head of the ink-jet printer,
wherein the recording material is plain paper having a liquid transfer amount during contact time of 5 ms according to the Bristow method of less than 9 ml/m$^2$.

A method for producing an ink-jet image comprising,
setting the ink of the present invention to an ink-jet printer; and
jetting droplets of the ink of the present invention onto a surface of a recording material through a nozzle of an ink-jet head of the ink-jet printer,
wherein the recording material is plain paper containing magnesium in an amount of 0.2–10 mg per gram of the plain paper.

A method for producing an ink-jet image comprising,
setting the ink of the present invention to an ink-jet printer; and
jetting droplets of the ink of the present invention onto a surface of a recording material through a nozzle of an ink-jet head of the ink-jet printer,
wherein a volume of each droplet is 0.1–10.0 pl.

A method for producing an ink-jet image comprising,
setting the ink of the present invention to an ink-jet printer; and
jetting droplets of the ink of the present invention onto a surface of a recording material through a nozzle of the ink-jet head of the ink-jet printer,
wherein an interval between a finishing time of jetting onto the surface of the recording material and a starting time of jetting on the other surface of the recording material is less than 5 seconds.

The present invention will now be detailed further. Initially, behavior of the ink of the present invention on a recording medium will be described.

It is possible to describe the penetration of ink into paper by the use of the Lucas-Washburn formula:

$$L/t^{1/2} = \{(r \cdot \gamma \cdot \cos \theta)/(2\eta)\}^{1/2}$$

L: penetration distance
t: time
r: diameter of the capillary tube of paper
γ: surface tension of the liquid
θ: contact angle
η: viscosity On the left of the above formula, the penetration distance of ink in paper is divided by the square root of time, so that this formula represents the ink penetration rate.

According to this formula, the square root of γ cos θ which is the term on the right relates to the ink penetration rate. Namely, a large γ cos θ value represents a high ink penetration rate, while a small γ cos θ value represents a low one.

Ink of a large γ cos θ value, namely ink of a high penetration rate, readily penetrates into paper whereby the reverse side penetration in which the ink penetrates into the reverse side of paper, and bleeding, in which ink laterally in the paper, tend to occur.

Further, ink of a small γ cos θ value, namely ink of a low penetration rate, selectively penetrates into portions of paper which are more porous resulting in irregular spreading of the ink, whereby feathering results. Further, such ink tends to result in beading in which mottling is formed on solid image portions in such a manner that ink droplets are blended with the previously deposited ink droplets which have not yet completely penetrated into the paper. In addition, a low penetration rate means that after printing, it requires time to dry the print, resulting in problems.

In an attempt to minimize the aforesaid reverse side penetration and bleeding, in the conventional ink, γ cos θ has been decreased, while in order to minimize feathering as well as beading, and to achieve rapid drying of prints, γ cos θ has been increased. Alternatively, a γ cos θ value in which both are suitably balanced has been selected. However, in such inks, characteristics between "reverse side penetration and bleeding" and "feathering and beading" are scrambled for, and both have not been compatible.

Figure 1:
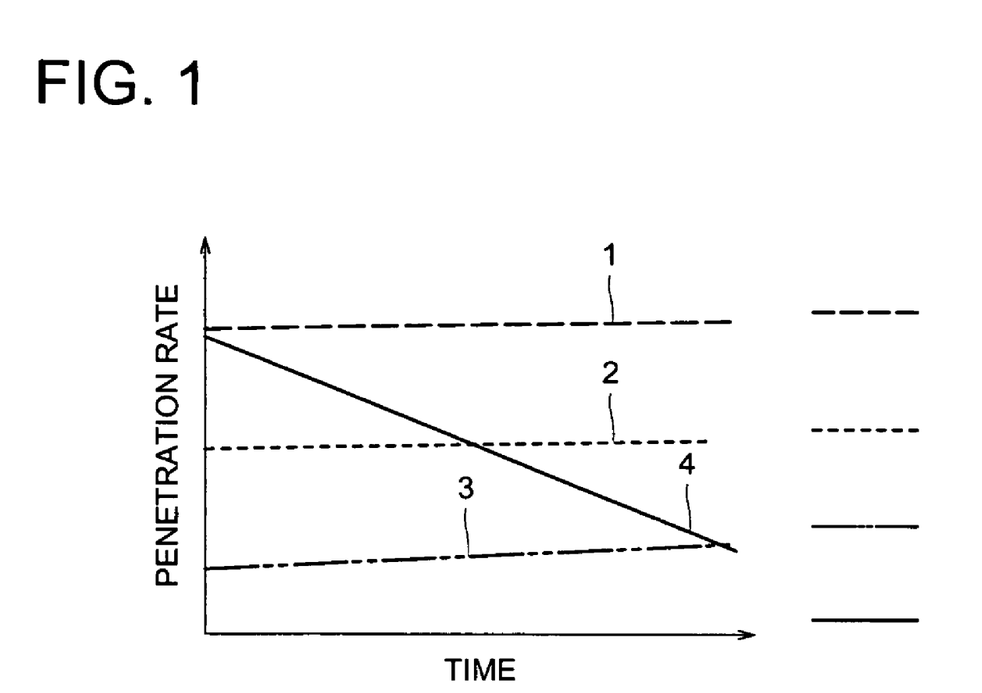
FIG. 1 is a conceptual view showing varying penetration rates of known inks (1 to 3) and the ink of the present invention (4).

FIG. 1 shows a conceptual view showing varying penetration rate of known ink and ink of the present invention. For example, it is reported (refer to JP-A No. 6-136308) that print quality is improved by specifying advanced tension (above-mentioned γ cos θ) to at least a certain value. However, though the resulting ink is effective in minimizing beading as well as feathering, it results in bleeding as well as reverse side penetration. Ink (refer to JP-A No. 6-228475), in which penetration and drying properties are enhanced, exhibits the same results as above. These inks correspond to "Known Ink 1" indicated as "1" in FIG. 1.

Further, ink is disclosed (refer to JP-A No. 6-136306) which results in relatively small penetration in the vertical direction of the paper but readily spreads in the traverse direction by decreasing surface tension, and increasing the aforesaid contact angle (above-mentioned γ cos θ). However, in the aforesaid ink, the above-mentioned "reverse side penetration and bleeding" and "feathering and beading" are only suitably balanced. As a result, sufficiently desired effects are not obtained. Ink (refer to JP-A No. 7-278481) in which the adhesion force (above-mentioned γ cos θ) is determined in the suitable range exhibit the same results as above. These inks correspond to "Known Ink 2" indicated as "2" in FIG. 1.

Further, as in "Known Ink 3" indicated as "3" in FIG. 1, ink of which penetration rate does not vary, while maintaining a low rate, results in feathering as well as beading, as noted above. Still further, since the aforesaid ink tends to not penetrate into the paper sheet, as noted above, it takes time for drying after printing.

As described above, no consideration was paid to conventional ink in which γ cos θ, which represents the penetration rate, varies in response to elapse of time. As a result, it has been impossible to make "reverse side penetration and bleeding" and "feathering and beading" compatible.

Ink of the present invention indicated as "4" in FIG. 1 breaks common sense with regard to conventional inks noted above and is one in which the penetration rate decreases with time, namely one in which the square root of $\gamma \cos \theta$ decreases over time. Further, $\gamma \cos \theta$ initially is a large value, whereby ink readily penetrates into the paper sheet. "Initially" means "at the time of initial exposure to atmospheric conditions". The timing of initially is; immediately after production of the ink; or immediately after opening a sealed ink container which has been stored.

As a result, neither feathering nor beading occurs. After all the ink penetrates into the recording medium, during migration of the ink in the paper sheet, $\gamma \cos \theta$ decreases to a definite ratio, namely tendency of migration of the ink in the paper sheet decreases to a definite ratio, whereby the ink results in neither reverse side penetration nor bleeding. In addition, since the ink of the present invention initially exhibits a large $\gamma \cos \theta$ value, the ink quickly penetrates into the recording medium, whereby the ink is desirably dried.

Disclosed as an ink in which the physical properties vary over time is an ink in which the surface tension increases by at least 1 mN/m over time (refer to JP-A No. 2002-235022). However, it is not known that when physical properties vary over time, printing quality is improved without fail. Ink, shown in the example of JP-A No. 2002-235022, which has an initial surface tension of 39–45 mN/m results in less than 4 of an initial value of the square root of $\gamma \cos \theta$ in terms of the present invention and consequently results in a low penetration rate, whereby feathering is not effectively minimized.

Further, even though an initially high penetration rate decreases over time, in the case in which the ratio decrease is small, ink migrates in the paper sheet prior to a sufficient decrease of the penetration rate of the ink. As a result, reverse side penetration as well as bleeding results.

As in the present invention, by only varying the penetration rate from a high value to a low value within a definite time, it is possible to make "reverse side penetration and bleeding" and "feathering and beading" compatible. The concept that the penetration rate is self-controlled to result in variation from the high value to the low value within a definite time is initially introduced in the present invention.

In addition, another excellent advantage of the present invention is that penetration of the entire ejected ink is controlled.

Disclosed as methods which make "reverse side penetration and bleeding" and "feathering and beading" compatible are an ink set which employs an anionic colorant and a cationic colorant (refer to JP-A No. 2002-88290), and an ink in which a pigment is employed as a colorant; after ejection onto paper, the colorant and an ink solvent separate so that the colorant remains on the paper surface (refer to JP-A No. 2003-96367). However, in both methods, the types of usable colorants are limited.

On the contrary, the present invention relates to a method in which the penetration of all the ink, namely the position of the liquid portion of the ink in the paper sheet is controlled. As a result, colorants may for example, be either dyes or pigments, whereby the range of colorant selection is broadened.

Listed as a means to prepare ink which satisfies claim 1 of the present invention is, for example, incorporation of solvents at a relatively small surface tension and a relatively high evaporation rate in a suitable ratio based on the other solvent composition in the ink. As described below, accepted as the plain paper in claim 1 of the present invention is Xerox 4024 (manufactured by Xerox Corp.) which is a copy sheet, as a representative.

Listed as functions required for water-soluble solvents employed in ink are various characteristics such as an increase in stability of colorants (dye solubility and pigment dispersibility), viscosity control to eject an ink via jetting, and hygroscopic property and moisture retention property to secure stability during ejection. Due to the above, commonly employed in ink are combinations of several types of solvents exhibiting various characteristics.

Further, in addition to solvents, commonly added to ink are surface active agents, antiseptics, and pH control agents.

Various solvents, additives, or colorants described above vary $\gamma \cos \theta$ of all the inks according to each addition amount.

Accordingly, upon taking into account the total composition of ink, it is essential to control the square root of $\gamma \cos \theta$ to the desired value by incorporating solvents of a low surface tension and a high evaporation rate in an optimal amount.

"A surface tension (mN/m) of the ink upon initial exposure" indicates as below. The $\gamma$ value is an intrinsic value of the ink which is determined immediately after production of the ink or immediately after opening a sealed ink container which has been stored.

$\gamma$ (mN/m) was determined by the use of an automatic surface tension balance (Model CVBP-Z, manufactured by Kyowa Interface Science Co., Ltd.) using a platinum plate. $\theta$ was determined by the use of an automatic contact angle meter (Model CA-VP, also manufactured by Kyowa Interface Science Co., Ltd.). In practice, droplets of a volume of 1 μL were deposited onto an image formed on Xerox 4024 (manufactured by Xerox Corp.), which was a copy sheet and contact angle $\theta$ was determined by the use of the $\theta/2$ method. $\theta$ was determined 2.5 milliseconds after the droplet completely left from the tip of the syringe needle and the average of three values was designated as $\theta$.

In view of beading and bleeding, the initial value of the square root of $\gamma \cos \theta$ is preferably 4–6, and is more preferably 4–5, since reverse side penetration is thereby more retarded. When the square root of $\gamma \cos \theta$ is less than 4, it takes more time until the ink penetrates into the paper sheet, whereby drying property is degraded. On the other hand, when it exceeds 6, spread of the ink in the lateral direction with respect to the recording medium increases, resulting in pronounced bleeding.

The ratio of (square root of $\gamma' \cos \theta'$)/(square root of $\gamma \cos \theta$) is usually 0.30–0.85. When the ratio is less than 0.30, colorants deposit or aggregate near head nozzles due to excessively rapid evaporation of ink, whereby nozzles tend to be clogged. On the other hand, when it is at least 0.85, as seen in conventional inks, characteristics are competitively captured between "bleeding and reverse side penetration" and "beading and bleeding", desired effects are not realized.

Listed as water-soluble organic solvents are alcohols (e.g., methanol, ethanol, propanol, pentanol, hexanol, cyclohexanol, and benzyl alcohol); polyhydric alcohols (e.g., ethylene glycol, diethylene glycol, triethylene glycol, polyethylene glycol, propylene glycol, dipropylene glycol, tripropylene glycol, polypropylene glycol, butylene glycol, hexanediol, pentanediol, glycerin, hexanetriol, and thiodiglycol); polyhydric alcohol ethers (e.g., ethylene glycol monomethyl ether, ethylene glycol monomethyl ether, ethylene glycol monobutyl ether, ethylene glycol monophenyl ether, diethylene glycol monomethyl ether, diethylene glycol monomethyl ether, diethylene glycol monobutyl ether, diethylene glycol dimethyl ether, propylene glycol monomethyl ether, propylene glycol monomethyl ether, propylene glycol monobutyl ether, ethylene glycol monomethyl ether acetate, triethylene glycol monomethyl ether, triethylene glycol monomethyl ether, triethylene glycol monobutyl ether, triethylene glycol dimethyl ether, dipropylene glycol monopropyl ether, and tripropylene glycol dimethyl ether); amines (e.g., ethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tatramethylpropylenediamine); amides (e.g., formamide, N,N-dimethylformamide, and N,N-dimethylacetamide); heterocyclic rings (e.g., 2-pyrrolidone, N-methyl-2-pyrrolidone, N-cyclohexyl-2-pyrrolidone, 2-oxazolidone, and 1,3-dimethyl-2-imidazolidine); sulfoxides (e.g., dimethylsulfoxide); and sulfones (e.g., sulfolane).

Among the above-listed water-soluble organic solvents, preferred solvents for the present invention are; methanol, ethanol, 1-propanol, 2-propanol, n-butanol, sec-butanol, isobutanol and tert-butanol.

Listed as examples of colorants in the present invention are water-soluble dyes and pigments. Listed as examples of water-soluble dyes may be azo dyes, azomethine dyes, xanthene dyes, and quinone dyes. Listed as specific compounds of water-soluble dyes may be, for example, compounds exemplified in paragraph No. 0053 of JP-A No. 2002-338856. These are described in "Senshoku Noto (Dying Notes) 21st Edition" (published by Senshoku Sha).

Further, employed as pigments usable in the present invention may be conventional organic and inorganic pigments known in the art. Listed as examples are azo pigments such as azo lakes, insoluble azo pigments, condensed azo pigments, or chelate azo pigments; polycyclic pigments such as phthalocyanine pigments, perylene and perylene pigments, anthraquinone pigments, quinacridone pigments, dioxazine pigments, thioindigo pigments, isoindolinone pigments, or quinophthalone pigments; dye lakes such as basic dye type lakes or acidic dye type lakes; organic pigments such as nitro pigments, nitroso pigments, aniline black, or daylight fluorescent pigments; and inorganic pigments such as carbon black.

In the ink of the present invention, it is possible to select the proportion of colorants in the range of 0.1–30 percent by weight. When photographic images are formed utilizing ink-jet printing, it is preferable to prepare so-called dark and pale inks in which the proportion of individual colorants varies and is then used. Further, if desired, in view of color reproduction, it is preferable to use specific colored inks such as red, green, or blue.

In view of ejection response of ink, it is preferable that when ink is allowed to stand at 40° C. and 2 percent relative humidity for one hour, the viscosity decreases 0.0–2.0 mPa.s from the initial value. Generally, when the ink is allowed to stand in an exposed system, water evaporates resulting in concentrated water-soluble organic solvents, whereby the viscosity of ink increases. When such phenomena occur near nozzles of ink-jet heads, particularly, the rate and volume of initial ink droplets becomes unstable, whereby problems of print quality result. With regard to the ink of the present invention, when water-soluble organic solvents, which relate to viscosity, more preferentially evaporate than water, it is possible to reduce viscosity, to differ from the conventional ink.

With a decrease in viscosity of at most 2.0 mPa.s, the decrease in viscosity $\eta$ in the Lucas-Washburn formula is retarded and an excessive increase in ink penetration is retarded, whereby preferably, reverse side penetration and bleeding tend not to occur. In view of ejection stability, the initial value of viscosity is preferably 1–6 mPa.s. Ink density, as described herein, refers to weight (g) per ml of ink.

Viscosity was determined at 25° C. employing Viscomate VM-1G (manufactured by Yamaichi Electronics Co., Ltd.). The measured value was divided by the density of the measured ink and corrections were made so that the viscosity of water at 25° C. results in 0.89 mPa.s.

It is particularly preferred that the ink of the present invention is employed as an ink-jet ink. However, it is also possible to employ it as a stamp ink or a ballpoint ink.

As an ink-jet recording method, an ink set, comprised of at least a yellow ink, a magenta ink, a cyan ink, and a black ink, is employed and a so-called colored ink-jet printer can be employed.

In an ink-jet recording method employing a plurality of inks, it is preferable that the present invention is applied to the black ink which is often used to print a highly detailed pattern such as text.

Further, it is preferable that the total plurality of inks used are replaced with the inks of the present invention, since reverse side penetration, feathering, bleeding, and beading are not only minimized but also mixing between different colors adjacent to each other (bleeding) is also minimized.

Preferred as recording media employed in the present invention are plain paper sheets represented by office paper sheets such as copy sheets, due to low cost. Further, in order to prepare high quality images, recording media may be employed which comprise a support having coated thereon a recording liquid receptive layer.

Plain paper, as described herein, is preferably 80–200 μm non-coated paper which belongs to a part of non-coated paper, special printing paper, and communication paper. Examples of plain paper of the present invention include upper class printing paper, middle class printing paper, low class printing paper, special printing paper such as lightweight printing paper, ultra lightweight coated paper, and colored woodfree paper, business forms, PPC paper, and other communication paper. Specifically, there are various kinds of paper described below as well as various modified/processed papers, however, the present invention is not limited thereto. Examples include Woodfree Paper, Colored Woodfree Paper, Recycled Paper, Copying Paper-Colored, OCR paper, Carbonless Copying Paper-Colored, Synthetic Paper such as Upo 60, 80, and 110 micron, Upocoat 70 and 90 micron, others such as Single-sided Art Paper 68 kg, Coated Paper 90 kg, Form Matte Paper 70, 90, and 110 kg, Foamed PET 38 micron, and Mitsuori-Kun (all manufactured by Kobayashi Kirokushi Co., Ltd.); OK Woodfree Paper, New OK Woodfree Paper, Sun Flower, Phenix, OK Royal White, Export Woodfree Paper (NPP, NCP, NWP, and Royal White), OK Book Paper, OK Cream Book Paper, OK Map Paper, OK Ishikari, Kyurei, OK Form, and OKH, NIP-N (all manufactured by Shin Oji Paper Co., Ltd.); Kin-O, Toko, Export Woodfree Paper, Special Procurement Woodfree Paper, Book Paper, Book Paper L, Pale Cream Book Paper, Shorisukasho Paper, Continuous Slip Paper, Woodfree NIP Paper, Ginkan, Kinyo, Kinyo (W), Bridge, Capital, Ginkan Shoseki, Harp, Harp Cream, SK Color, Shoken Paper, Opera Cream, Opera, KYP Karte, Silvia HN, Excellent Form, NPI Form DX (all manufactured by Nippon Paper Industries Co., Ltd.); Pearl, Kinbishi, Pale Cream Woodfree Paper, Specially Made Book Paper, Super Book Paper, Dia Form, and Ink-jet Form, (all manufactured by Mitsubishi Paper Mills Ltd.); Kinju V, Kinju SW, Hakuzo, High Class Publication Paper, Cream Kinju, Cream Hakuzo, Security-Note Paper, Book Paper, Map Paper, Copying Paper, and HNF (all manufactured by Hokuestu Paper Mills, Ltd.); Shiorai, Telephone Directory Cover Paper, Book Paper, Cream Shiorai Medium Rough, Cream Shiorai Major Rough, and DSK (all manufactured by Daishowa Paper Manufacturing Co., Ltd.); Sendai MP Woodfree Paper, Kinko, Raicho Woodfree, Hanging Paper, Color Paper Board, Dictionary Paper, Cream Book, White Book, Cream Woodfree Paper, and Map Paper (all manufactured by Chuuetsu Pulp & Paper Co., Ltd.); OP Kinsakura (manufactured by Chuetsu); Kinsa, Reference Book Paper, Exchange Card Paper (white), Form Printing Paper, KRF, White Form, Color Form, (K) NIP, Fine PPC, and Kishu Ink-jet Paper (all manufactured by Kishu Paper Co., Ltd.); Taiou, Prime Form, Kanto, Kant White, Dante, CM Paper, Dante Comic, Heine, Paperback Paper, Heine S, New AD Paper, Utrillo Excel, Exel Super A, Kant Exel, Excel Super B, Dante Excel, Heine Excel, Excel Super C, Excel Super D, AD Excel, Excel Super E, New Bright Form, and New Bright NIP (all manufactured by Daio Paper Corp.); Nichirin, Getsurin, Unrei, Ginga, Hakuun, Geturin Ace, Hakuun Ace, and Unrei Ace (all manufactured bNippon Shigyo Co., Ltd.); Taiou, Bright Form, and Bright NIP (all manufactured by Nagoya Pulp Corp.); Botan A, Kinbato, Tokubotan, Shirobotan A, Shirobotan C, Ginbato, Super Shirobotan A, Pale Cream Shirobotan, Special Medium Quality Paper, Shirobato, Super Shirobato, Aobato, Akabato, Kinbato M Snow Vision, Snow Vision, Kinbato Snow Vision, Shirobato M, Super DX, Hamanasu O, Akabato M, and HK Super Printing Paper (all manufactured by Honshu Paper Co., Ltd.); Star Linden (A·AW), Star Elm, Star Maple, Star Laurel, Star Poplar, MOP, Star Cherry I, Cherry I Super, Cherry II Super, Star Cherry III, Star Cherry III Super, and Cherry IV Super (all manufactured by Marusumi Paper Co., Ltd.); SHF (manufactured by Toyo Pulp Co., Ltd.); and TRP (Tokai-Pulp & Paper Co., Ltd.). Listed as recording media are, for example, woodfree paper, colored woodfree paper, ink-jet common and special paper, recycled paper, and slip paper. Of these, 80–200 μm thick paper widely employed as plain paper is especially preferred to achieve the objectives of the present invention. Also preferred as recording media employed for the present invention is non-coated paper. In terms of the ratio of elemental components, it is preferable that the number of elements of aluminum and silicon is at most 150 and 200, respectively with respect to 100 carbon elements.

In view of minimizing feathering, plain paper employed in the present invention preferably results in less than 9 ml/m$^2$ of the liquid transfer amount during contact time of 5 milliseconds, which is determined according to the Bristow method. The Bristow method, as described herein, is a measurement method specified in "Japan TAPPI Nos. 51–87" (Paper Pulp Technical Association, Paper Pulp Test Method Nos. 51–87, Bristow Method). The liquid transfer amount was determined as follows. Used as measurement liquid was a 0.1 percent aqueous solution of a surface active agent (Surfinol 465, manufactured by Shin-Etsu Chemical Co., Ltd.), and used as a measurement apparatus was an automatic scanning liquid absorbing meter (KM500 Win, manufactured by Kumagai Riki Kogyo). The liquid transfer amount during 5 milliseconds was determined three times and the average of these values was designated as a liquid transfer amount.

The reasons that feathering tends to not occur on the aforesaid plain paper are not well understood. However, in the case of a contact time of 5 milliseconds, the liquid transfer amount varies with the surface roughness of the paper. Cellulose fibers are not completely exposed on the surface of plain paper at a liquid transfer amount of less than 9 ml/m$^2$. Since any of the common surface smoothing treatments, such as a surface sizing treatment is performed, it is assumed that feathering in which ink penetrates along fibers is not visually pronounced.

In view of minimizing reverse side penetration, the amount of magnesium incorporated in plain paper is preferably at least 0.2 mg/g.

The magnesium amount was determined by the use of a wavelength-dispersing type fluorescent X-ray photometer, while preparing a calibration curve. Reasons for the reverse side penetration tending to not occur on the aforesaid plain paper are still not well understood. In the case in which magnesium salts are incorporated into plain paper in at least definite amount, it is assumed that when ink penetrates into the interior of paper and wets the surface of magnesium, heat of wetting is generated to promote evaporation of water-soluble organic solvents in the ink, whereby no ink liquid tends to reach the reverse side of the paper. The amount of magnesium is preferably less than 10 mg/g to avoid problems of increase in cost during production of plain paper.

In the ink-jet recording method of the present invention, the volume of liquid droplets is preferably 0.1–10.0 pl. When the volume of liquid droplets is in the aforesaid range, the surface area with respect to the volume of ink droplets is large, whereby evaporation of water-soluble organic solvents in the ink is enhanced. As a result, reverse side penetration tends not to occur. In the case in which the volume of liquid droplets is at least 0.1 pl, stability during jetting is enhanced. On the other hand, in the case in which it is at most 10.0 pl, reverse side penetration is effectively minimized and graininess of printed image quality is improved.

The ink of the present invention is suitable particularly for the ink-jet recording method for duplex printing. It is specifically preferable that the above ink is employed for an ink-jet recording method in which time from completion of printing the entire obverse surface to initiation of printing the reverse surface is within 5 seconds. In an ink-jet recording method, which rapidly prints both surfaces, it is essential that prior to initiation of printing the reverse surface, the obverse surface be sufficiently dried. When the reverse surface is printed before the obverse surface is not completely dried, it becomes difficult to accurately convey paper and in addition, paper in a wet state may occasionally be torn. Further, when the interior of a printer is not dry, it may be stained with ink, whereby stains are occasionally transferred to printed images. Use of the ink of the present invention results in no such problems due to the fact that the ink is rapidly dried.

"Time from completion of printing the entire obverse surface to initiation of printing the reverse surface" refers to time from the deposition of the last ink droplet onto the initially printed surface of paper to deposition of the first ink droplet onto the other surface of the paper.

It is possible to incorporate surface active agents into the ink of the present invention in order to control surface tension. Employed as surface active agents are, for example, anionic, cationic, amphoteric, and nonionic ones. Representatively, listed as anionic surface active agents are fatty acid salts, alkylsulfuric acid salts, alkylsulfuric acid esters, alkylbenzenesulfonic acid salts, alkylnaphthalenesulfonic acid salts, dialkylsulfosuccinic acid salts, alkylphosphoric acid ester salts, alkylnaphthalenesulfonic acid formalin condensation products, and polyoxyethylene alkylsulfuric acid ester salts; listed as cationic surface active agents are amine salts, tetraalkyl quaternary ammonium salts, trialkyl quaternary ammonium salts, alkylpyridinium salts, and alkylquinolium salts; listed as nonionic surface active agent are polyoxyethylene alkyl ether, polyoxyethylene alkyl phenyl ether, polyoxyethylene sorbitan fatty acid esters, polyoxyethylene alkylamines, ethylene oxides of polypropylene glycol, and ethylene oxide addition products of acetylene glycol.

The added amount of these surface active agents is determined based on the kinds and amounts of water-soluble organic solvents as well as other additives, but is preferably 0.01–5 percent by weight with respect to the total ink.

Further, for the purpose of enhancing ejection stability, suitability for print heads as well as ink cartridges, storage stability, and other characteristics, incorporated into the ink of the present invention may be viscosity modifiers, resistivity control agents, film forming agents, antioxidants, antiseptic agents, mildewcides, rust-inhibitors, pH control agents, dye dissolving aids, antifoaming agents, and metal chelating agents, which satisfy specific purposes.

Listed as specifically preferred examples of antiseptic agents as well as mildewcides are, for example, sodium benzoate, sodium pentachlorophenolate, sodium 2-pyridinethiol-1-oxide, sodium sorbiate, sodium dehydroacetate, 1,2-benzisothiazoline-3-one (such as Proxel CGL, Proxel BD, Proxel GXL, Proxel TN, and Proxel KL-2, available from Avicia) and 4-chloro-3-methylphenol (such as Preventol CMK, available from Bayer Corp.).

Listed as examples of pH control agents are amines such as diethanolamine, triethanolamine, propanolamine, or morpholine, and modified products thereof, inorganic salts such as potassium hydroxide, sodium hydroxide, or lithium hydroxide, ammonium hydroxide, quaternary ammonium hydroxide (tetramethylammonium), carbonates such as potassium carbonate, sodium carbonate, or lithium carbonate, and others such as phosphates.

Listed as examples of dye dissolving aids are ureas such as urea, thiourea, or tetramethylurea.

Preferred as the ink-jet recording method of the present invention is an on-demand system ink-jet recording method which performs recording by ejecting ink employing an electric-mechanical conversion system. Listed as the electric-mechanical conversion system is, for example, an electric-mechanical conversion system utilizing a piezo element.

Preferred as ink-jet recording methods of the present invention is one which performs recording by ejecting ink employing the electric-thermal conversion system. Listed as electric-thermal conversion systems is, for example, an electric-thermal conversion system employing a thermal element.

EXAMPLES

The present invention will now be described referring to examples, however, the present invention is not limited thereto.

Preparation of Example Inks 1–21 and Comparative Example Inks 1–22

The components described below were mixed and well stirred. Thereafter, the resulting mixture was filtered employing a membrane filter of a pore diameter of 0.45 μm, whereby Ink 1 was prepared.

| | |
|---|---|
| Direct Yellow 86 | 3.7 weight % |
| 2-Butanol | 10.0 weight % |
| Ethylene glycol | 15.0 weight % |
| Glycerin | 15.0 weight % |
| Proxel XL-2 (manufactured by Avicia) | 0.2 weight % |
| Triethanolamine | 1.0 weight % |
| Ion-exchanged water | 55.1 weight % |

Further, each of the ink compositions having the compositions described in Table 1 was prepared in the same manner as Example Ink 1.

Further, γ (in mN/m) and θ of each of the prepared inks were determined employing the aforesaid methods, and the square root of the product of γ and cos θ was calculated.

Subsequently, 20 g of ink was placed in a lidless glass container of a surface area of 50 cm², and was allowed to stand at 40° C. and relative humidity of 2 percent for one hour. Thereafter, the square root of γ cos θ (the square root of γ' cos θ') was determined employing the aforesaid methods, and (square root of γ cos θ)/(square root of γ' cos θ') was calculated.

TABLE 1-1

| Ink No. | Dye | First Solvent | % | Second Solvent | % | Third Solvent | % | Fourth Solvent | % | Fifth Solvent | % |
|---|---|---|---|---|---|---|---|---|---|---|---|
| Example 1 | D.Y.86 | 3.7 | 2-BuOH | 10.0 | EG | 15.0 | Gly | 15.0 | | | |
| Example 2 | D.Y.132 | 3.2 | 1-BuOH | 5.0 | EG | 10.0 | TriEG | 5.0 | TEGBE | 2.0 | |
| Example 3 | A.Y.17 | 3.3 | EtOH | 20.0 | DEG | 25.0 | | | | | |
| Example 4 | A.Y.23 | 3.5 | t-BuOH | 10.0 | 1-ProOH | 10.0 | 1,3-ProD | 5.0 | TPG | 2.0 | |
| Example 7 | A.R.82 | 3.3 | 2-ProOH | 20.0 | DEG | 10.0 | PG | 3.0 | | | |
| Example 8 | A.R.289 | 3.2 | t-BuOH | 6.0 | 1,3-ProD | 3.0 | Gly | 9.0 | 1,2-PeD | 5.0 | |
| Example 9 | A.R.249 | 3.2 | t-BuOH | 9.0 | EG | 15.0 | Gly | 10.0 | | | |
| Example 10 | A.R.52 | 3.5 | 2-BuOH | 5.0 | 2-ProOH | 5.0 | t-BuOH | 5.0 | 1-BuOH | 1.0 | Gly | 18.0 |
| Example 12 | D.B.199 | 3.8 | t-BuOH | 15.0 | TeEG | 10.0 | 1,5-PeD | 3.0 | TPG | 3.0 | |
| Example 13 | D.B.86 | 3.7 | 2-ProOH | 18.0 | 1,4-BuD | 6.0 | DEGBE | 1.0 | | | |
| Example 14 | D.B.199 | 3.3 | 2-ProOH | 13.0 | Gly | 20.0 | | | | | |
| Example 15 | A.B.9 | 3.1 | 2-BuOH | 10.0 | 1-ProOH | 13.0 | PG | 15.0 | | | |
| Example 18 | F.Bk.1 | 4.1 | EtOH | 22.5 | DPG | 20.0 | Gly | 5.0 | | | |
| Example 19 | F.Bk.2 | 4.0 | t-BuOH | 10.0 | TPG | 16.0 | 1,2-HD | 1.5 | | | |
| Example 20 | A.Bk.17 | 4.0 | 2-BuOH | 14.0 | PG | 13.0 | 2-Pyr | 5.0 | | | |
| Example 21 | F.Bk.2 | 3.5 | t-BuOH | 8.0 | 2-BuOH | 5.0 | iso-BuOH | 5.0 | 1,4-BuD | 16.0 | |

TABLE 1-2

| Ink No. | Surface Active Agent | % | Antiseptic Agent | % | Other Additives | % | Water % | Square Root of γcosθ | *1 |
|---|---|---|---|---|---|---|---|---|---|
| Example 1 | | | XL-2 | 0.2 | TEA | 1.0 | 55.1 | 5 | 0.74 |
| Example 2 | | | | | | | 74.8 | 4 | 0.84 |
| Example 3 | S465 | 0.01 | | | EDTA | 0.3 | 51.4 | 4 | 0.75 |
| Example 4 | | | GXL | 0.1 | | | 69.4 | 4 | 0.80 |
| Example 7 | | | | | | | 63.7 | 4 | 0.83 |
| Example 8 | | | CRL | 0.3 | EDTA | | 73.5 | 4 | 0.76 |
| Example 9 | L-62 | 0.05 | | | | | 62.8 | 4 | 0.66 |
| Example 10 | | | | | TEA | 0.5 | 62.0 | 4 | 0.79 |
| Example 12 | | | | | | | 65.2 | 4 | 0.63 |
| Example 13 | | | CRL | 0.1 | | | 71.2 | 4 | 0.78 |
| Example 14 | L-62 | 0.02 | | | TEA | 1.1 | 62.6 | 4 | 0.83 |
| Example 15 | | | | | | | 58.9 | 4 | 0.71 |
| Example 18 | | | XL-2 | 0.1 | | | 48.3 | 4 | 0.70 |
| Example 19 | | | | | EDTA | 0.2 | 68.3 | 4 | 0.65 |
| Example 20 | S465 | 0.03 | GXL | 0.5 | | | 63.5 | 5 | 0.78 |
| Example 21 | | | | | | | 62.5 | 4 | 0.66 |

*1: (square root of γ' cosθ')/(square root of γcosθ)

D.Y.86: Direct Yellow 86
D.Y.132: Direct Yellow 132
A.Y.17: Acid Yellow 17
A.Y.23: Acid Yellow 23
A.R.82: Acid Red 82
A.R.289: Acid Red 289
A.R.249: Acid Red 249
A.R.52: Acid Red 52
D.B.199: Direct Blue 199
D.B.86: Direct Blue 86
A.B.9: Acid Blue 9
F.Bk.1: Food Black 1
F.Bk.2: Food Black 2
A.Bk.17: Acid Black 17
2-BuOH: 2-butanol
1-BuOH: 1-butanol
EtOH: ethanol
t-BuOH: tert-butanol
2-PrOH: 2-propanol
iso-BuOH: isobutanol
1-PrOH: 1-propanol
EG: ethylene glycol
DEG: diethylene glycol
1,3-ProD: 1,3-propanediol
TeEG: tetraethylene glycol
1,4-BuD: 1,4-butanediol
Gly: glycerin
DPG: dipropylene glycol
TPG: tripropylene glycol
PG: propylene glycol
TriEG: triethylene glycol
1,5-PeD: 1,5-pentanediol
DEGBE: diethylene glycol monobutyl ether
1,2-HD: 1,2-hexanediol
2-Pyr: 2-pyrrolidone
TEGBE: triethylene glycol monobutyl ether
S465: Surfinol 465 (manufactured by Shin-Etsu Chemical Co., Ltd.)
L-62: Adekapuroronic L62 (manufactured by Asahi Denka Kogyo Co., Ltd.)
Proxel: Proxel XL-2 (manufactured by Avicia)
Proxel: Proxel GXL (manufactured by Avicia)
Proxel: Proxel CRL (manufactured by Avicia)
TEA: triethanolamine
EDTA: disodium ethylenediaminetetraacetate

TABLE 2-1

| Ink No. | Dye | % | First Solvent | % | Second Solvent | % | Third Solvent | % | Fourth Solvent | % | Fifth Solvent | % |
|---|---|---|---|---|---|---|---|---|---|---|---|---|
| Comp. 1 | D.Y.86 | 3.7 | 2-BuOH | 25.0 | EG | 15.0 | Gly | 15.0 | | | | |
| Comp. 2 | D.Y.132 | 3.2 | 1-BuOH | 1.0 | EG | 10.0 | TriEG | 5.0 | TEGBE | 2 | | |
| Comp. 3 | A.Y.17 | 3.3 | EtOH | 20.0 | DEG | 25 | | | | | | |
| Comp. 4 | A.Y.23 | 3.5 | t-BuOH | 20.0 | 1-ProOH | 15.0 | 1,3-ProD | 5.0 | TPG | 2 | | |
| Comp. 5 | D.Y.132 | 3.2 | TEGBE | 15.0 | EG | 25.0 | | | | | | |
| Comp. 6 | D.Y.86 | 3.7 | DPGmME | 15.0 | EG | 5.0 | Gly | 5.0 | | | | |
| Comp. 7 | A.R.82 | 3.3 | 2-ProOH | 5.0 | DEG | 10.0 | PG | 3.0 | | | | |
| Comp. 8 | A.R.289 | 3.2 | t-BuOH | 6.0 | 1,3-ProD | 3.0 | Gly | 9.0 | 1,2-PeD | 15 | | |
| Comp. 9 | A.R.249 | 3.2 | t-BuOH | 9.0 | EG | 15 | Gly | 10.0 | | | | |
| Comp. 10 | A.R.52 | 3.5 | 2-BuOH | 1.0 | 2-ProOH | 2.0 | t-BuOH | 2.0 | 1-BuOH | 1 | Gly | 18.0 |
| Comp. 11 | A.R.82 | 3.3 | TPG | 15.0 | EG | 5.0 | Gly | 5.0 | | | | |
| Comp. 12 | D.B.199 | 3.8 | t-BuOH | 30.0 | TeEG | 10.0 | 1,5-PeD | 3.0 | TPG | 3 | | |
| Comp. 13 | D.B.86 | 3.7 | 2-ProOH | 3.0 | 1,4-BuD | 6.0 | DEGBE | 1.0 | | | | |
| Comp. 14 | D.B.199 | 3.3 | 2-ProOH | 13.0 | Gly | 20 | | | | | | |
| Comp. 15 | A.B.9 | 3.1 | 2-BuOH | 20.0 | 1-ProOH | 20.0 | PG | 15.0 | | | | |
| Comp. 16 | D.B.199 | 3.8 | 1,5-PeD | 15.0 | Gly | 25 | | | | | | |
| Comp. 17 | D.B.86 | 3.7 | TPGmME | 15.0 | EG | 5 | Gly | 5.0 | | | | |
| Comp. 18 | F.Bk.1 | 4.1 | EtOH | 15.0 | DPG | 20.0 | Gly | 5.0 | | | | |
| Comp. 19 | F.Bk.2 | 4.0 | t-BuOH | 10.0 | TPG | 16.0 | 1,2-HD | 8.0 | | | | |

TABLE 2-1-continued

| Ink No. | Dye | First % | Solvent | Second % | Solvent | Third % | Solvent | Fourth % | Solvent | Fifth % | Solvent | % |
|---|---|---|---|---|---|---|---|---|---|---|---|---|
| Comp. 20 | A.Bk.17 | 4.0 | 2-BuOH | 3.0 | PG | 13 | 2-Pyr | 5.0 | | | | |
| Comp. 21 | F.Bk.2 | 3.5 | t-BuOH | 8.0 | 2-BuOH | 20.0 | iso-BuOH | 5.0 | 1,4-BuD | 16 | | |
| Comp. 22 | A.Bk17 | 4.0 | 1,2-HD | 15.0 | EG | 5 | Gly | 5.0 | | | | |

Comp.: Comparative Example
DPGmME: dipropylene glycol monomethyl ether
TPGmME: tripropylene glycol monoethyl ether

TABLE 2-2

| Ink No. | Surface Active Agent | % | Antiseptic Agent | % | Other Additives | % | Water % | Square Root of $\gamma\cos\theta$ | *1 |
|---|---|---|---|---|---|---|---|---|---|
| Comp. 1 | | | XL-2 | 0.2 | TEA | 1 | 40.1 | 5 | 0.89 |
| Comp. 2 | | | | | | | 78.8 | 3 | 0.90 |
| Comp. 3 | S465 | 0.20 | | | EDTA | 0.3 | 51.2 | 4 | 1.00 |
| Comp. 4 | | | GXL | 0.1 | | | 54.4 | 5 | 0.92 |
| Comp. 5 | | | | | | | 56.8 | 4 | 1.04 |
| Comp. 6 | | | GXL | 0.1 | | | 71.2 | 3 | 1.01 |
| Comp. 7 | | | | | | | 78.7 | 3 | 0.86 |
| Comp. 8 | | | CRL | 0.3 | EDTA | 0.1 | 63.4 | 4 | 0.95 |
| Comp. 9 | L-62 | 3.00 | | | | | 59.8 | 4 | 0.96 |
| Comp. 10 | | | | | TEA | 0.5 | 72.0 | 3 | 0.87 |
| Comp. 11 | | | | | | | 71.7 | 2 | 1.35 |
| Comp. 12 | | | | | | | 50.2 | 5 | 0.89 |
| Comp. 13 | | | CRL | 0.1 | | | 86.2 | 3 | 0.93 |
| Comp. 14 | L-62 | 1.00 | | | TEA | 1.1 | 61.6 | 4 | 1.00 |
| Comp. 15 | | | | | | | 41.9 | 5 | 0.88 |
| Comp. 16 | | | GXL | 0.1 | | | 56.1 | 2 | 1.30 |
| Comp. 17 | | | | | | | 71.3 | 3 | 0.99 |
| Comp. 18 | | | XL-2 | 0.1 | | | 55.8 | 3 | 0.74 |
| Comp. 19 | | | | | EDTA | 0.2 | 61.8 | 4 | 0.93 |
| Comp. 20 | S465 | 0.03 | GXL | 0.5 | | | 74.5 | 3 | 0.89 |
| Comp. 21 | | | | | | | 47.5 | 5 | 0.88 |
| Comp. 22 | | | | | | | 71.0 | 4 | 1.10 |

Comp.: Comparative Example
*1: (square root of $\gamma'\cos\theta'$)/(square root of $\gamma\cos\theta$)

Preparation of Image Recording Materials

Used as a printer was Ink-jet Printer BJ S700 (being an electric-thermal conversion system), manufactured by Canon Inc. Example Ink 1 was loaded, and plain paper Hammermil LASER PRINT (manufactured by INTERNATIONAL PAPER CO.) as a recording medium was also loaded in the aforesaid printer. Subsequently prepared were image recording samples carrying a 10×10 cm solid image. Image recording samples were prepared in the same manner as above, except that Example Ink 1 was replaced with each of Example Inks 2–21 as well as Comparative Example Inks 1–22

Recyconomic (manufactured by SCHNEIDER SOHNE CO.), Konica Copy Paper NR-A80 (manufactured by Konica Corp.) and Xerox 4024 (manufactured by Xerox Corp.), which are all plain paper sheets, were individually loaded in the aforesaid ink-jet printer, and image recording samples were prepared employing each of Example Inks 1–21 and Comparative Example Inks 1–22

By employing image recording samples prepared by using each of Example Inks 1–21 and Comparative Example Inks 1–22, the following evaluation was performed. Table 3 shows the results.

Incidentally, Example X and Comparative Example X (where X represent a numerical figure) are shown in which type of used solvents is the same, but the amounts are different.

Analysis of Plain Papers and Evaluation of Images of Image Recording Samples

The liquid transfer amount (ml/m$^2$) during a contact time of 5 milliseconds and the amount of magnesium were determined employing the aforesaid methods.

The image quality of each of the image recording samples, described below, was subjected to a 10-grade evaluation in which the best quality was designated as 10 and the poorest quality was designated as 1.

Reverse Side Penetration

The obverse side (being the ink deposited side) and the reverse side of each of the resulting image recording samples were compared, and evaluation was performed employing the 10 grades described below. Cases in which the reverse side of the paper was the same as the portion onto which printing was not performed employing ink, were graded as 10. Cases in which ink penetrated to the reverse side of the paper and showed no difference between the printed obverse portion and the reverse portion were graded as 1.

Bleeding

Evaluation was performed based on 10 grades in which cases in which the periphery of 1×1 cm solid image was widened to result in an area of at a minimum of 1.2 cm² was graded as 1 and cases in which the aforesaid periphery was not widened was graded as 10.

Beading

Mottling on solid printed images was visually evaluated based on 10 grades in which poor image quality due to marked mottling was graded as 1 and no mottling was graded as 10.

Feathering

Feathering was visually evaluated based on 10 grades in which cases in which the boundary between the printed portion and the non-printed portion of a solid image resulted in a marked irregular contour in a beard shape was graded as 1, and a sharp contour resulting in no irregularity was graded as 10.

TABLE 3

| | \*\*1 | \*\*2 | \*1 | \*2 | \*\*1 | \*\*2 | \*1 | \*2 | \*\*1 | \*\*2 | \*1 | \*2 | \*\*1 | \*\*2 | \*1 | \*2 |
|---|---|---|---|---|---|---|---|---|---|---|---|---|---|---|---|---|
| Plain Paper | HM-L | | | | Recyconomic | | | | NR-A80 | | | | Xerox 4024 | | | |
| Liquid Transfer Amount (ml/m²) | 6 | | | | 11 | | | | 7 | | | | 10 | | | |
| Milligram Amount (mg/g) | 5.1 | | | | 0.7 | | | | 0.1 | | | | 0 | | | |
| Ink No. | \*\*1 | \*\*2 | \*1 | \*2 | \*\*1 | \*\*2 | \*1 | \*2 | \*\*1 | \*\*2 | \*1 | \*2 | \*\*1 | \*\*2 | \*1 | \*2 |
| Ex. 1 | 10 | 10 | 10 | 10 | 10 | 10 | 8 | 8 | 8 | 8 | 10 | 10 | 8 | 8 | 8 | 8 |
| Ex. 2 | 10 | 10 | 10 | 10 | 10 | 10 | 8 | 8 | 8 | 8 | 10 | 10 | 8 | 8 | 8 | 8 |
| Ex. 3 | 10 | 10 | 10 | 10 | 10 | 10 | 8 | 8 | 8 | 8 | 10 | 10 | 8 | 8 | 8 | 8 |
| Ex. 4 | 10 | 10 | 10 | 10 | 10 | 10 | 8 | 8 | 8 | 8 | 10 | 10 | 8 | 8 | 8 | 8 |
| Ex. 7 | 10 | 10 | 10 | 10 | 10 | 10 | 8 | 8 | 8 | 8 | 10 | 10 | 8 | 8 | 8 | 8 |
| Ex. 8 | 10 | 10 | 10 | 10 | 10 | 10 | 8 | 8 | 8 | 8 | 10 | 10 | 8 | 8 | 8 | 8 |
| Ex. 9 | 10 | 10 | 10 | 10 | 10 | 10 | 8 | 8 | 8 | 8 | 10 | 10 | 8 | 8 | 8 | 8 |
| Ex. 10 | 10 | 10 | 10 | 10 | 10 | 10 | 8 | 8 | 8 | 8 | 10 | 10 | 8 | 8 | 8 | 8 |
| Ex. 12 | 10 | 10 | 10 | 10 | 10 | 10 | 8 | 8 | 8 | 8 | 10 | 10 | 8 | 8 | 8 | 8 |
| Ex. 13 | 10 | 10 | 10 | 10 | 10 | 10 | 8 | 8 | 8 | 8 | 10 | 10 | 8 | 8 | 8 | 8 |
| Ex. 14 | 10 | 10 | 10 | 10 | 10 | 10 | 8 | 8 | 8 | 8 | 10 | 10 | 8 | 8 | 8 | 8 |
| Ex. 15 | 10 | 10 | 10 | 10 | 10 | 10 | 8 | 8 | 8 | 8 | 10 | 10 | 8 | 8 | 8 | 8 |
| Ex. 18 | 10 | 10 | 10 | 10 | 10 | 10 | 8 | 8 | 8 | 8 | 10 | 10 | 8 | 8 | 8 | 8 |
| Ex. 19 | 10 | 10 | 10 | 10 | 10 | 10 | 8 | 8 | 8 | 8 | 10 | 10 | 8 | 8 | 8 | 8 |
| Ex. 20 | 10 | 10 | 10 | 10 | 10 | 10 | 8 | 8 | 8 | 8 | 10 | 10 | 8 | 8 | 8 | 8 |
| Ex. 21 | 10 | 10 | 10 | 10 | 10 | 10 | 8 | 8 | 8 | 8 | 10 | 10 | 8 | 8 | 8 | 8 |
| Comp. 1 | 3 | 3 | 5 | 5 | 3 | 3 | 3 | 3 | 1 | 2 | 5 | 5 | 1 | 1 | 3 | 3 |
| Comp. 2 | 4 | 4 | 3 | 3 | 4 | 4 | 1 | 1 | 2 | 3 | 3 | 3 | 2 | 2 | 1 | 1 |
| Comp. 3 | 3 | 3 | 5 | 5 | 3 | 3 | 3 | 3 | 1 | 2 | 5 | 5 | 1 | 1 | 3 | 3 |
| Comp. 4 | 3 | 3 | 5 | 5 | 3 | 3 | 3 | 3 | 1 | 2 | 5 | 5 | 1 | 1 | 3 | 3 |
| Comp. 5 | 3 | 3 | 5 | 5 | 3 | 3 | 3 | 3 | 1 | 2 | 5 | 5 | 1 | 1 | 3 | 3 |
| Comp. 6 | 4 | 4 | 5 | 5 | 4 | 4 | 3 | 3 | 2 | 3 | 5 | 5 | 2 | 2 | 3 | 3 |
| Comp. 7 | 4 | 4 | 3 | 3 | 4 | 4 | 1 | 1 | 2 | 3 | 3 | 3 | 2 | 2 | 1 | 1 |
| Comp. 8 | 3 | 3 | 5 | 5 | 3 | 3 | 3 | 3 | 1 | 2 | 5 | 5 | 1 | 1 | 3 | 3 |
| Comp. 9 | 3 | 3 | 5 | 5 | 3 | 3 | 3 | 3 | 1 | 2 | 5 | 5 | 1 | 1 | 3 | 3 |
| Comp. 10 | 4 | 4 | 3 | 3 | 4 | 4 | 1 | 1 | 2 | 3 | 3 | 3 | 2 | 2 | 1 | 1 |
| Comp. 11 | 4 | 4 | 3 | 3 | 4 | 4 | 1 | 1 | 2 | 3 | 3 | 3 | 2 | 2 | 1 | 1 |
| Comp. 12 | 3 | 3 | 5 | 5 | 3 | 3 | 3 | 3 | 1 | 2 | 5 | 5 | 1 | 1 | 3 | 3 |
| Comp. 13 | 5 | 5 | 3 | 3 | 5 | 5 | 1 | 1 | 3 | 3 | 3 | 3 | 3 | 3 | 1 | 1 |
| Comp. 14 | 3 | 3 | 5 | 5 | 3 | 3 | 3 | 3 | 1 | 2 | 5 | 5 | 1 | 1 | 3 | 3 |
| Comp. 15 | 3 | 3 | 5 | 5 | 3 | 3 | 3 | 3 | 1 | 2 | 5 | 5 | 1 | 1 | 3 | 3 |
| Comp. 16 | 4 | 4 | 3 | 3 | 4 | 4 | 1 | 1 | 2 | 3 | 3 | 3 | 2 | 2 | 1 | 1 |
| Comp. 17 | 4 | 4 | 5 | 5 | 4 | 4 | 3 | 3 | 2 | 3 | 5 | 5 | 2 | 2 | 3 | 3 |
| Comp. 18 | 6 | 6 | 3 | 3 | 4 | 4 | 1 | 1 | 2 | 3 | 3 | 3 | 2 | 2 | 1 | 1 |
| Comp. 19 | 3 | 3 | 5 | 5 | 3 | 3 | 3 | 3 | 1 | 2 | 5 | 5 | 1 | 1 | 3 | 3 |
| Comp. 20 | 4 | 4 | 3 | 3 | 4 | 4 | 1 | 1 | 2 | 3 | 3 | 3 | 2 | 2 | 1 | 1 |
| Comp. 21 | 3 | 3 | 5 | 5 | 3 | 3 | 3 | 3 | 1 | 2 | 5 | 5 | 1 | 1 | 3 | 3 |
| Comp. 22 | 3 | 3 | 5 | 5 | 3 | 3 | 3 | 3 | 1 | 2 | 5 | 5 | 1 | 1 | 3 | 3 |

\*\*1: Reverse Side Penetration
\*\*2: Bleeding
\*1: Beading
\*2: Feathering
Ex.: Example
Comp.: Comparative Example
HM-L: Hammermill LASER PRINT (manufactured by INTERNATIONAL PAPER CO.)
Recyconomic: Recyconomic (manufactured by SCHNEIDER SOHNE Co.)
NR-A80: Konica Copy Paper NR-A80 (manufacture by Konica Corp.)
Xerox 4024: Xerox 4024 (manufactured by Xerox Corp.)

As can clearly be seen from Table 3, the inks of the present invention resulted in excellent image quality on plain paper.

Further, it was confirmed that the inks of the present invention were usable in continuous ejection experiments without any problem and exhibited sufficient adaptability for the electric-thermal conversion system.

Preparation of Example Inks 23–40 and Comparative Inks 23–41

Pigment dispersions were prepared by the use of the following method.

| (Yellow Pigment Dispersion) | |
|---|---|
| C.I. Pigment Yellow 74 | 95 g |
| Demol C (manufactured by Kao Corp.) | 65 g |
| Ethylene glycol | 100 g |
| Ion-exchanged water | 120 g | were mixed and dispersed employing a sand grinder filled with 0.5 mm zirconia beads at a volume ratio of 50 percent, whereby a yellow pigment dispersion was prepared. The average particle diameter of the resulting pigment dispersion was 122 nm. The particle diameter was determined by the use of Zeta Sizer 1000, manufactured by Malvern Inc.

| (Magenta Pigment Dispersion) | |
|---|---|
| C.I. Pigment Red 122 | 105 g |
| Joncryl 61 (an acryl-styrene based resin, manufactured by Johnson Co.) | 60 g |
| Glycerin | 100 g |
| Ion-exchanged water | 130 g | were mixed and dispersed employing a sand grinder filled with 0.5 mm zirconia beads at a volume ratio of 50 percent, whereby a magenta pigment dispersion was prepared. The average particle diameter of the resulting pigment dispersion was 85 nm.

| (Cyan Pigment Dispersion) | |
|---|---|
| C.I. Pigment Blue 15:3 | 100 g |
| Demol C | 68 g |
| Diethylene glycol | 100 g |
| Ion-exchanged water | 125 g | were mixed and dispersed employing a sand grinder filled with 0.5 mm zirconia beads at a volume ratio of 50 percent, whereby a cyan pigment dispersion was prepared. The average particle diameter of the resulting pigment dispersion was 105 nm.

| Black Pigment Dispersion | |
|---|---|
| Carbon black (NIPex 90, manufactured by Degusa Corp.) | 20 g |
| Styrene-acrylic acid copolymer (at a molecular weight of 7,000 and an acid value of 150) | 10 g |
| Glycerin | 10 g |
| Ion-exchanged water | 60 g | were mixed and dispersed employing a horizontal bead mill filled with 0.3 mm zirconia beads at a volume ratio of 60 percent. The average particle diameter of the resulting pigment dispersion was 75 nm.

Subsequently, the components described below were blended with each of the aforesaid pigment dispersions and sufficiently stirred. Thereafter, the resulting mixture was filtered employing a membrane filter at a pore diameter of 0.8 μm, whereby Example Ink 23 was prepared. "%" is weight percent, respectively.

| | |
|---|---|
| Yellow Pigment Dispersion | 25% |
| 2-Butanol | 10% |
| Ethylene glycol | 15% |
| Glycerin | 15% |
| Proxel KL-2 | 0.2% |
| Triethanolamine | 1% |
| Ion-exchanged water | 33.8% |

Further, Example Inks 23–40 and Comparative Example Inks 23–41, which had compositions described in Tables 4 and 5 were prepared in the same manner as Example Ink 23.

TABLE 4-1

| Ink No. | Pigment | First Solvent | % | Second Solvent | % | Third Solvent | % | Fourth Solvent | % | Fifth Solvent | % |
|---|---|---|---|---|---|---|---|---|---|---|---|
| Example 23 | Yellow Pigment Dispersion | 25.0 | 2-BuOH | 10.0 | EG | 15.0 | Gly | 15.0 | | | |
| Example 24 | Yellow Pigment Dispersion | 15.0 | EtOH | 20.0 | DEG | 25.0 | | | | | |
| Example 25 | Yellow Pigment Dispersion | 20.0 | t-BuOH | 10.0 | 1-ProOH | 10.0 | 1,3-ProD | 5.0 | TPG | 2.0 | |
| Example 28 | Magenta Pigment Dispersion | 15.0 | 2-ProOH | 20.0 | DEG | 10.0 | PG | 3.0 | | | |
| Example 29 | Magenta Pigment Dispersion | 10.0 | t-BuOH | 6.0 | 1,3-ProD | 3.0 | Gly | 9.0 | 1,2-PeD | 5.0 | |
| Example 30 | Magenta Pigment Dispersion | 20.0 | 2-BuOH | 5.0 | 2-ProOH | 5.0 | t-BuOH | 5.0 | 1-BuOH | 1.0 | Gly | 18.0 |

TABLE 4-1-continued

| Ink No. | Pigment | % | First Solvent | % | Second Solvent | % | Third Solvent | % | Fourth Solvent | % | Fifth Solvent | % |
|---|---|---|---|---|---|---|---|---|---|---|---|---|
| Example 32 | Cyan Pigment Dispersion | 10.0 | t-BuOH | 15.0 | TeEG | 10.0 | 1,5-PeD | 3.0 | TPG | 3.0 | | |
| Example 33 | Cyan Pigment Dispersion | 20.0 | 2-ProOH | 18.0 | 1,4-BuD | 6.0 | DEGBE | 1.0 | | | | |
| Example 34 | Cyan Pigment Dispersion | 13.0 | 2-ProOH | 13.0 | Gly | 20.0 | | | | | | |
| Example 37 | Black Pigment Dispersion | 18.0 | EtOH | 22.5 | DPG | 20.0 | Gly | 5.0 | | | | |
| Example 38 | Black Pigment Dispersion | 13.0 | t-BuOH | 10.0 | TPG | 16.0 | 1,2-HD | 1.5 | | | | |
| Example 39 | Black Pigment Dispersion | 20.0 | 2-BuOH | 14.0 | PG | 13.0 | 2-Pyr | 5.0 | | | | |
| Example 40 | Black Pigment Dispersion | 21.0 | t-BuOH | 8.0 | 2-BuOH | 5.0 | iso-BuOH | 5.0 | 1,4-BuD | 16.0 | | |

TABLE 4-2

| Ink No. | Surface Active Agent | % | Antiseptic Agent | % | Other Additives | % | Water % | Square Root of γcosθ | *1 |
|---|---|---|---|---|---|---|---|---|---|
| Example 23 | | | XL-2 | 0.2 | TEA | 1.0 | 33.8 | 5 | 0.75 |
| Example 24 | S465 | 0.01 | | | EDTA | 0.3 | 39.7 | 4 | 0.77 |
| Example 25 | | | GXL | 0.1 | | | 52.9 | 4 | 0.82 |
| Example 28 | | | | | | | 52.0 | 4 | 0.84 |
| Example 29 | | | CRL | 0.3 | EDTA | | 66.7 | 4 | 0.78 |
| Example 30 | | | | | TEA | 0.5 | 45.5 | 4 | 0.81 |
| Example 32 | | | | | | | 59.0 | 4 | 0.64 |
| Example 33 | | | CRL | 0.1 | | | 54.9 | 4 | 0.80 |
| Example 34 | L-62 | 0.02 | | | TEA | 1.1 | 52.9 | 4 | 0.83 |
| Example 37 | | | XL-2 | 0.1 | | | 34.4 | 4 | 0.71 |
| Example 38 | | | | | EDTA | 0.2 | 59.3 | 4 | 0.66 |
| Example 39 | S465 | 0.03 | GXL | 0.5 | | | 47.5 | 5 | 0.80 |
| Example 40 | | | | | | | 45.0 | 4 | 0.67 |

*1: (square root of γ' cosθ'/(square root of γcosθ)

TABLE 5-1

| Ink No. | Pigment | % | First Solvent | % | Second Solvent | % | Third Solvent | % | Fourth Solvent | % | Fifth Solvent | % |
|---|---|---|---|---|---|---|---|---|---|---|---|---|
| Comp. 23 | Yellow Pigment Dispersion | 25.0 | 2-BuOH | 25.0 | EG | 15.0 | Gly | 15.0 | | | | |
| Comp. 24 | Yellow Pigment Dispersion | 15.0 | EtOH | 20.0 | DEG | 25 | | | | | | |
| Comp. 25 | Yellow Pigment Dispersion | 20.0 | t-BuOH | 20.0 | 1-ProOH | 15.0 | 1,3-ProD | 5.0 | TPG | 2 | | |
| Comp. 26 | Yellow Pigment Dispersion | 22.0 | TEGBE | 15.0 | EG | 25.0 | | | | | | |
| Comp. 27 | Yellow Pigment Dispersion | 17.0 | DPGmME | 15.0 | EG | 5.0 | Gly | 5.0 | | | | |
| Comp. 28 | Magenta Pigment Dispersion | 15.0 | 2-ProOH | 5.0 | DEG | 10.0 | PG | 3.0 | | | | |
| Comp. 29 | Magenta Pigment Dispersion | 10.0 | t-BuOH | 6.0 | 1,3-ProD | 3.0 | Gly | 9.0 | 1,2-PeD | 15 | | |
| Comp. 30 | Magenta Pigment Dispersion | 20.0 | 2-BuOH | 1.0 | 2-ProOH | 2.0 | t-BuOH | 2.0 | 1-BuOH | 1 | Gly | 18.0 |
| Comp. 31 | Magenta Pigment Dispersion | 14.0 | TPG | 15.0 | EG | 5.0 | Gly | 5.0 | | | | |
| Comp. 32 | Cyan Pigment Dispersion | 10.0 | t-BuOH | 30.0 | TeEG | 10.0 | 1,5-PeD | 3.0 | TPG | 3 | | |
| Comp. 33 | Cyan Pigment Dispersion | 20.0 | 2-ProOH | 3.0 | 1,4-BuD | 6.0 | DEGBE | 1.0 | | | | |
| Comp. 34 | Cyan Pigment Dispersion | 13.0 | 2-ProOH | 13.0 | Gly | 20 | | | | | | |
| Comp. 35 | Cyan Pigment Dispersion | 21.0 | 1,5-PeD | 15.0 | Gly | 25 | | | | | | |
| Comp. 36 | Cyan Pigment Dispersion | 17.0 | TPGmME | 15.0 | EG | 5 | Gly | 5.0 | | | | |
| Comp. 37 | Black Pigment Dispersion | 18.0 | EtOH | 15.0 | DPG | 20.0 | Gly | 5.0 | | | | |

TABLE 5-1-continued

| Ink No. | Pigment | % | First Solvent | % | Second Solvent | % | Third Solvent | % | Fourth Solvent | % | Fifth Solvent | % |
|---|---|---|---|---|---|---|---|---|---|---|---|---|
| Comp. 38 | Black Pigment Dispersion | 13.0 | t-BuOH | 10.0 | TPG | 16.0 | 1,2-HD | 8.0 | | | | |
| Comp. 39 | Black Pigment Dispersion | 20.0 | 2-BuOH | 3.0 | PG | 13 | 2-Pyr | 5.0 | | | | |
| Comp. 40 | Black Pigment Dispersion | 21.0 | t-BuOH | 8.0 | 2-BuOH | 20.0 | iso-BuOH | 5.0 | 1,4-BuD | 16 | | |
| Comp. 41 | Black Pigment Dispersion | 16.0 | 1,2-HD | 15.0 | EG | 5 | Gly | 5.0 | | | | |

Comp.: Comparative Example

TABLE 5-2

| Ink No. | Surface Active Agent | % | Anti-septic Agent | % | Other Additives | % | Water % | Square Root of $\gamma\cos\theta$ | *1 |
|---|---|---|---|---|---|---|---|---|---|
| Comp. 23 | | | XL-2 | 0.2 | TEA | 1 | 18.8 | 5 | 0.91 |
| Comp. 24 | S465 | 0.20 | | | EDTA | 0.3 | 39.5 | 4 | 1.02 |
| Comp. 25 | | | GXL | 0.1 | | | 37.9 | 5 | 0.94 |
| Comp. 26 | | | | | | | 38.0 | 4 | 1.06 |
| Comp. 27 | | | GXL | 0.1 | | | 57.9 | 3 | 1.03 |
| Comp. 28 | | | | | | | 67.0 | 3 | 0.88 |
| Comp. 29 | | | CRL | 0.3 | EDTA | 0.1 | 56.6 | 5 | 0.97 |
| Comp. 30 | | | | | TEA | 0.5 | 55.5 | 3 | 0.89 |
| Comp. 31 | | | | | | | 61.0 | 2 | 1.38 |
| Comp. 32 | | | | | | | 44.0 | 5 | 0.91 |
| Comp. 33 | | | CRL | 0.1 | | | 69.9 | 3 | 0.95 |
| Comp. 34 | L-62 | 1.00 | | | TEA | 1.1 | 51.9 | 4 | 1.02 |
| Comp. 35 | | | GXL | 0.1 | | | 38.9 | 2 | 1.33 |
| Comp. 36 | | | | | | | 58.0 | 3 | 1.01 |
| Comp. 37 | | | XL-2 | 0.1 | | | 41.9 | 3 | 0.75 |
| Comp. 38 | | | | | EDTA | 0.2 | 52.8 | 5 | 0.95 |
| Comp. 39 | S465 | 0.03 | GXL | 0.5 | | | 58.5 | 3 | 0.91 |
| Comp. 40 | | | | | | | 30.0 | 5 | 0.90 |
| Comp. 41 | | | | | | | 59.0 | 4 | 1.12 |

Comp.: Comparative Example
*1: (square root of $\gamma'\cos\theta'$/(square root of $\gamma\cos\theta$)

Preparation of Image Recording Samples

Employed as a printer was Ink-jet Printer MJ-810C (being an electric-thermal conversion system), manufacture by Seiko Epson Corp., while employed as a recording medium was the aforesaid plain paper. Image recording samples were then prepared employing each of Example Inks 23–40 as well as Comparative Inks 23–41. The resulting image recording samples were subjected to the aforesaid evaluation. Table 6 shows the results.

TABLE 6

| | Plain Paper | | | | | | | | | | | | | | |
|---|---|---|---|---|---|---|---|---|---|---|---|---|---|---|---|
| | HM-L | | | | Recyconomic | | | | NR-A80 | | | | Xerox 4024 | | | |
| | Liquid Transfer Amount (ml/m²) | | | | | | | | | | | | | | | |
| | 6 | | | | 11 | | | | 7 | | | | 10 | | | |
| | Milligram Amount (mg/g) | | | | | | | | | | | | | | | |
| | 5.1 | | | | 0.7 | | | | 0.1 | | | | 0 | | | |
| Ink No. | **1 | **2 | *1 | *2 | **1 | **2 | *1 | *2 | **1 | **2 | *1 | *2 | **1 | **2 | *1 | *2 |
| Ex. 23 | 10 | 10 | 10 | 10 | 10 | 10 | 8 | 8 | 8 | 8 | 10 | 10 | 8 | 8 | 8 | 8 |
| Ex. 24 | 10 | 10 | 10 | 10 | 10 | 10 | 8 | 8 | 8 | 8 | 10 | 10 | 8 | 8 | 8 | 8 |
| Ex. 25 | 10 | 10 | 10 | 10 | 10 | 10 | 8 | 8 | 8 | 8 | 10 | 10 | 8 | 8 | 8 | 8 |
| Ex. 28 | 10 | 10 | 10 | 10 | 10 | 10 | 8 | 8 | 8 | 8 | 10 | 10 | 8 | 8 | 8 | 8 |
| Ex. 29 | 10 | 10 | 10 | 10 | 10 | 10 | 8 | 8 | 8 | 8 | 10 | 10 | 8 | 8 | 8 | 8 |
| Ex. 30 | 10 | 10 | 10 | 10 | 10 | 10 | 8 | 8 | 8 | 8 | 10 | 10 | 8 | 8 | 8 | 8 |
| Ex. 32 | 10 | 10 | 10 | 10 | 10 | 10 | 8 | 8 | 8 | 8 | 10 | 10 | 8 | 8 | 8 | 8 |
| Ex. 33 | 10 | 10 | 10 | 10 | 10 | 10 | 8 | 8 | 8 | 8 | 10 | 10 | 8 | 8 | 8 | 8 |
| Ex. 34 | 10 | 10 | 10 | 10 | 10 | 10 | 8 | 8 | 8 | 8 | 10 | 10 | 8 | 8 | 8 | 8 |
| Ex. 37 | 10 | 10 | 10 | 10 | 10 | 10 | 8 | 8 | 8 | 8 | 10 | 10 | 8 | 8 | 8 | 8 |
| Ex. 38 | 10 | 10 | 10 | 10 | 10 | 10 | 8 | 8 | 8 | 8 | 10 | 10 | 8 | 8 | 8 | 8 |

TABLE 6-continued

| | Plain Paper | | | | | | | | | | | | | | | |
|---|---|---|---|---|---|---|---|---|---|---|---|---|---|---|---|---|
| | HM-L | | | | Recyconomic | | | | NR-A80 | | | | Xerox 4024 | | | |
| | Liquid Transfer Amount (ml/m²) | | | | | | | | | | | | | | | |
| | 6 | | | | 11 | | | | 7 | | | | 10 | | | |
| | Milligram Amount (mg/g) | | | | | | | | | | | | | | | |
| | 5.1 | | | | 0.7 | | | | 0.1 | | | | 0 | | | |
| Ink No. | **1 | **2 | *1 | *2 | **1 | **2 | *1 | *2 | **1 | **2 | *1 | *2 | **1 | **2 | *1 | *2 |
| Ex. 39 | 10 | 10 | 10 | 10 | 10 | 10 | 8 | 8 | 8 | 8 | 10 | 10 | 8 | 8 | 8 | 8 |
| Ex. 40 | 10 | 10 | 10 | 10 | 10 | 10 | 8 | 8 | 8 | 8 | 10 | 10 | 8 | 8 | 8 | 8 |
| Comp. 23 | 3 | 3 | 5 | 5 | 3 | 3 | 3 | 3 | 1 | 2 | 5 | 5 | 1 | 1 | 3 | 3 |
| Comp. 24 | 4 | 4 | 3 | 3 | 4 | 4 | 1 | 1 | 2 | 3 | 3 | 3 | 2 | 2 | 1 | 1 |
| Comp. 25 | 3 | 3 | 5 | 5 | 3 | 3 | 3 | 3 | 1 | 2 | 5 | 5 | 1 | 1 | 3 | 3 |
| Comp. 26 | 3 | 3 | 5 | 5 | 3 | 3 | 3 | 3 | 1 | 2 | 5 | 5 | 1 | 1 | 3 | 3 |
| Comp. 27 | 3 | 3 | 5 | 5 | 3 | 3 | 3 | 3 | 1 | 2 | 5 | 5 | 1 | 1 | 3 | 3 |
| Comp. 28 | 4 | 4 | 5 | 5 | 4 | 4 | 3 | 3 | 2 | 3 | 5 | 5 | 2 | 2 | 3 | 3 |
| Comp. 29 | 4 | 4 | 3 | 3 | 4 | 4 | 1 | 1 | 2 | 3 | 3 | 3 | 2 | 2 | 1 | 1 |
| Comp. 30 | 3 | 3 | 5 | 5 | 3 | 3 | 3 | 3 | 1 | 2 | 5 | 5 | 1 | 1 | 3 | 3 |
| Comp. 31 | 3 | 3 | 5 | 5 | 3 | 3 | 3 | 3 | 1 | 2 | 5 | 5 | 1 | 1 | 3 | 3 |
| Comp. 32 | 4 | 4 | 3 | 3 | 4 | 4 | 1 | 1 | 2 | 3 | 3 | 3 | 2 | 2 | 1 | 1 |
| Comp. 33 | 4 | 4 | 3 | 3 | 4 | 4 | 1 | 1 | 2 | 3 | 3 | 3 | 2 | 2 | 1 | 1 |
| Comp. 34 | 3 | 3 | 5 | 5 | 3 | 3 | 3 | 3 | 1 | 2 | 5 | 5 | 1 | 1 | 3 | 3 |
| Comp. 35 | 5 | 5 | 3 | 3 | 5 | 5 | 1 | 1 | 3 | 3 | 3 | 3 | 3 | 3 | 1 | 1 |
| Comp. 36 | 3 | 3 | 5 | 5 | 3 | 3 | 3 | 3 | 1 | 2 | 5 | 5 | 1 | 1 | 3 | 3 |
| Comp. 37 | 3 | 3 | 5 | 5 | 3 | 3 | 3 | 3 | 1 | 2 | 5 | 5 | 1 | 1 | 3 | 3 |
| Comp. 38 | 6 | 6 | 3 | 3 | 4 | 4 | 1 | 1 | 2 | 3 | 3 | 3 | 2 | 2 | 1 | 1 |
| Comp. 39 | 4 | 4 | 5 | 5 | 4 | 4 | 3 | 3 | 2 | 3 | 5 | 5 | 2 | 2 | 3 | 3 |
| Comp. 40 | 4 | 4 | 3 | 3 | 4 | 4 | 1 | 1 | 2 | 3 | 3 | 3 | 2 | 2 | 1 | 1 |
| Comp. 41 | 3 | 3 | 5 | 5 | 3 | 3 | 3 | 3 | 1 | 2 | 5 | 5 | 1 | 1 | 3 | 3 |

**1: Reverse Side Penetration
**2: Bleeding
*1: Beading and
*2: Feathering
Ex.: Example
Comp.: Comparative Example As can clearly be seen from Table 6, the inks of the present invention resulted in excellent image quality on plain paper.

Further, it was confirmed that the inks of the present invention were usable in continuous ejection experiments without any problem and exhibited sufficient adaptability for the electric-thermal conversion system.

Preparation of Example Inks 42–46

Based on the compositions in Table 7, Example Inks 42–46 were prepared employing the aforesaid method.

After each of the Example Inks was allowed to stand for an hour according to the aforesaid method, the resulting viscosity was determined employing the aforesaid method, and the decreased value (mPa.s) with respect to the viscosity prior to the one-hour standing was determined.

Further, ejection response property was evaluated based on 10 grades as described below. After continuous printing of three minutes, a head loaded with this ink was allowed to stand for 20 minutes without being capped at an ambience of 25° C. and 50 percent relative humidity. Thereafter, printing was again performed. Cases in which the first letter was not printed were graded as 1, while cases in which the first letter was printed with no problems were graded as 10. Further, 10-grade evaluation was performed depending on the degree of faintness of the letters.

TABLE 7

| Ink No. | Colorant | % | First Solvent | % | Second Solvent | % | Water Percent | Square Root of $\gamma\cos\theta$ | (Square Root of $\gamma'\cos\theta'$/ (Square Root of $\gamma\cos\theta$) | Viscosity Decrease (mPa · s) | Ejection Response Property |
|---|---|---|---|---|---|---|---|---|---|---|---|
| Example 42 | D.B.199 | 3.7 | t-BuOH | 15.0 | EG | 23.0 | 58.3 | 4.3 | 0.63 | 0.8 | 10 |
| Example 43 | D.B.199 | 3.7 | 2-ProOH | 20.0 | EG | 22.0 | 54.3 | 4.1 | 0.83 | 0.4 | 9 |
| Example 44 | D.B.199 | 3.7 | 2-BuOH | 15.0 | EG | 28.0 | 53.3 | 4.5 | 0.76 | 0.2 | 8 |
| Example 45 | Black Pigment Dispersion | 22.9 | t-BuOH | 15.0 | EG | 17.0 | 45.1 | 4.2 | 0.72 | 0.1 | 8 |
| Example 46 | D.B.199 | 3.7 | EtOH | 22.5 | EG | 29.0 | 44.8 | 3.9 | 0.70 | −0.2 | 5 |

As can clearly be seen from Table 7, the inks of the present invention, in which viscosity decrease was 0.2–2.0 mPa.s, exhibited excellent ejection response property.

Preparation of Ink Sets A–H

Example Inks 1–40 and Comparative Example Inks 1–41, prepared as above, were combined as shown in Table 8. The resulting combinations were designated as Ink Sets A–H.

Preparation of Image Recording Samples

Ink Set A was loaded in an on-demand type ink-jet printer, which was loaded with piezo type heads of a nozzle diameter of 23 μm, a driving frequency of 10 kHz, a number of nozzles of 128 per color, and a nozzle density of the same color of 90 dpi (dpi represents the number of dots per inch, namely per 2.54 cm) and which was set to result in a recording density of 1440 dpi×1440 dpi and a droplet volume of 6 pl per droplet. Further, loaded as a recording medium was plain paper, Konica Copy Paper NR-A100 (manufactured by Konica Corp.). Subsequently, 10×10 cm$^2$ solid images were printed so that images of each ink were adjacent to each other. Printing was performed while varying the adjacent position so that all inks of each color were combined. Further, recording samples were prepared in which 10-point letters were printed using the black ink on each of the solid yellow, magenta, and cyan images. The resulting image recording samples were subjected to the following evaluation. Table 8 shows the results.

Evaluation of Mixing between Colors

Presence of mixing between colors in the boundary area between colors of each of the resulting samples was visually observed and the aforesaid mixing between colors was evaluated based on the criteria below.

A: no mixing between colors in all the color boundary areas was noted
B: mixing between colors was noted at several positions on the boundary area between the black ink and the colored ink
C: mixing between colors was noted at several positions even between colored inks
D: highly marked mixing between colors was noted

TABLE 8

| Set No. | Colored | Ink No. | Mixing between Colors |
|---|---|---|---|
| A | Y Ink | Ex. 1 | A |
|   | M Ink | Ex. 7 |   |
|   | C Ink | Ex. 12 |   |
|   | K Ink | Ex. 18 |   |
| B | Y Ink | Ex. 23 | A |
|   | M Ink | Ex. 28 |   |
|   | C Ink | Ex. 32 |   |
|   | K Ink | Ex. 37 |   |
| C | Y Ink | Ex. 2 | A |
|   | M Ink | Ex. 8 |   |
|   | C Ink | Ex. 13 |   |
|   | K Ink | Ex. 38 |   |
| D | Y Ink | Comp. 1 | B |
|   | M Ink | Comp. 7 |   |
|   | C Ink | Comp. 12 |   |
|   | K Ink | Ex. 19 |   |
| E | Y Ink | Comp. 23 | B |
|   | M Ink | Comp. 28 |   |
|   | C Ink | Comp. 32 |   |
|   | K Ink | Ex. 39 |   |
| F | Y Ink | Comp. 3 | B |
|   | M Ink | Comp. 9 |   |
|   | C Ink | Comp. 13 |   |
|   | K Ink | Ex. 40 |   |

TABLE 8-continued

| Set No. | Colored | Ink No. | Mixing between Colors |
|---|---|---|---|
| G | Y Ink | Comp. 2 | D |
|   | M Ink | Comp. 8 |   |
|   | C Ink | Comp. 12 |   |
|   | K Ink | Comp. 18 |   |
| H | Y Ink | Comp. 24 | C |
|   | M Ink | Comp. 29 |   |
|   | C Ink | Comp. 32 |   |
|   | K Ink | Comp. 37 |   |

Ex.: Example
Comp.: Comparative example

As can clearly be seen from the results in Table 8, the ink-jet recording method employing the ink of the present invention resulted in minimal mixing between colors on plain paper.

Each of the inks shown in Table 9 was loaded in an on-demand type ink-jet printer, which was loaded with piezo type heads of a nozzle diameter of 10 μm, a driving frequency of 10 kHz, a number of nozzles of 128 per color, and a nozzle density of the same color of 90 dpi and which was set to result in a recording density of 1440 dpi×1440 dpi and the droplet volume as specified in Table 9. Further, loaded as a recording medium was plain paper, Konica Copy Paper NR-A100 (manufactured by Konica Corp.). Subsequently, 10×10 cm solid images were printed employing each ink. Reverse side penetration, bleeding, beading, and feathering of the resulting images were evaluated employing the aforesaid methods.

TABLE 9

| Ink No. | Liquid Droplet Volume (pl) | Reverse Side Penetration | Bleeding | Beading | Feathering |
|---|---|---|---|---|---|
| Example 12 | 0.03 | no stable ejection | | | |
| Example 12 | 0.1 | 10 | 10 | 10 | 10 |
| Example 12 | 2.0 | 10 | 10 | 10 | 10 |
| Example 12 | 8.0 | 9 | 9 | 9 | 9 |
| Example 12 | 20.0 | 8 | 8 | 8 | 8 |
| Example 32 | 0.04 | no stable ejection | | | |
| Example 32 | 0.1 | 10 | 10 | 10 | 10 |
| Example 32 | 2.0 | 10 | 10 | 10 | 10 |
| Example 32 | 8.0 | 9 | 9 | 9 | 9 |
| Example 32 | 20.0 | 8 | 8 | 8 | 8 |

As can clearly be seen from the results in Table 9, in the case of a liquid droplet volume of 0.1–10.0 pl, the recording method employing the ink of the present invention resulted in excellent images on plain paper. (Evaluation of Adaptability for Duplex Printing) Ink Set A was loaded in an on-demand type ink-jet printer, which was loaded with piezo type heads of a nozzle diameter of 23 μm, a driving frequency of 10 kHz, a number of nozzles of 128 per color, and a nozzle density of the same color of 90 dpi and which was set to result in a recording density of 1440 dpi×1440 dpi and a droplet volume of 6 pl per droplet. Further, loaded as a recording medium was plain paper, Konica Copy Paper NR-A100 (manufactured by Konica Corp.). Subsequently, 10×10 cm$^2$ solid images were printed employing each of the inks shown in Table 10.

After printing solid images, the image printed paper was quickly removed and re-loaded so that the surface on which images were not printed was on the obverse side, whereby duplex printing was performed. Time from completion of printing on the entire obverse surface to initiation of printing the reverse surface was within 3–4 seconds.

Subsequently, a printer which completed the duplex printing was employed without any modifications and the aforesaid plain paper was passed through the printer without ejection of ink. Staining in the printer was evaluated based on the amount of ink transferred to the plain paper.

A: no ink transfer was noted and the interior of the printer was not stained

B: ink transfer was noted and the interior pf the printer was stained

TABLE 10

| Ink | Staining in Interior of Printer | Remarks |
|---|---|---|
| Example 18 | A | Present Invention |
| Example 40 | A | Present Invention |
| Comparative Ink 1 | B | Comparative Example |
| Comparative Ink 2 | B | Comparative Example |
| Comparative Ink 3 | It was not possible to perform duplex printing due to paper damage during printing the reverse side. | Comparative Example |

Comparative Ink 1: hp56 (black ink manufactured by Hewlett-Packard Co.)
Comparative Ink 2: BCI-1201Bk (black ink, manufactured by Canon Inc.)
Comparative Ink 3: BCI-6PC (cyan ink, manufactured by Canon Inc.)

As can clearly be seen from Table 10, the recording method employing the ink of the present invention resulted in no staining in the interior or the printer due to quick drying property after printing and exhibited high suitability for high speed duplex printing.

What is claimed is:

1. An ink comprising water, butanol and a colorant, wherein the ink exhibits a $(\gamma \cos \theta)^{1/2}$ value of 4 to 6, and satisfies Formula (I):

$$0.3 \leq ((\gamma' \cos \theta')^{1/2}/(\gamma \cos \theta)^{1/2}) \leq 0.85, \quad \text{Formula (I)}$$

wherein $\gamma$ represents a surface tension (mN/m) of the ink upon initial exposure to atmospheric conditions, $\theta$ represents an initial contact angle of the ink with respect to plain paper upon initial exposure to atmospheric conditions; and $\gamma'$ represents a surface tension (mN/m) of the ink after standing for one hour at 40° C. and relative humidity of 2 percent, and $\theta'$ represents an initial contact angle of the ink with respect to plain paper after standing for one hour at 40° C. and relative humidity of 2 percent.

2. The ink of claim 1 wherein the ink exhibits a decrease of viscosity in an amount of 0.0–2.0 mPa.s when the ink has been allowed to stand for one hour at 40° C. and 2 percent relative humidity after production of the ink or opening a sealed ink container storing the ink.

3. A method for producing an inkjet image comprising, setting the ink of claim 1 to an inkjet printer; and
jetting droplets of the ink onto a surface of a recording material through a nozzle of an ink-jet head of the ink-jet printer.

4. A method for producing an ink-jet image comprising, setting the ink of claim 1 to an inkjet printer; and
jetting droplets of a plurality of inks which includes the ink of claim 1 onto a surface of a recording material through a nozzle of an inkjet head of the ink-jet printer, wherein the colorant contained in the ink of claim 1 has a black color.

5. A method for producing an ink-jet image comprising, setting the ink of claim 1 to an inkjet printer; and
jetting droplets of a plurality of inks onto a surface of a recording material through a nozzle of an inkjet head of the ink-jet printer,
wherein the plurality of inks are the inks of claim 1.

6. A method for producing an inkjet image comprising, setting the ink of claim 1 to an ink-jet printer; and
jetting droplets of the ink of claim 1 onto a surface of a recording material through a nozzle of an inkjet head of the inkjet printer,
wherein the recording material is plain paper having a liquid transfer amount during contact time of 5 mg according to the Bristow method of less than 9 ml/m$^2$.

7. A method for producing an ink-jet image comprising, setting the ink of claim 1 to an ink-jet printer; and
jetting droplets of the ink of claim 1 onto a surface of a recording material through a nozzle of an inkjet head of the ink-jet printer, wherein the recording material is plain paper containing magnesium in an amount of 0.2–10 mg per gram of the plain paper.

8. A method for producing an inkjet image comprising, setting the ink of claim 1 to an ink-jet printer; and
jetting droplets of the ink of claim 1 onto a surface of a recording material through a nozzle of an inkjet head of the ink-jet printer, wherein a volume of each droplet is 0.1–10.0 pl.

9. A method for producing an inkjet image comprising, setting the ink of claim 1 to an ink-jet printer; and
jetting droplets of the ink of claim 1 onto a surface of a recording material through a nozzle of the ink-jet head of the ink-jet printer,
wherein an interval between a finishing time of jetting onto the surface of the recording material and a starting time of jetting on the other surface of the recording material is less than 5 seconds.

* * * * *